United States Patent Office 3,497,497
Patented Feb. 24, 1970

3,497,497
AMINO ACID SALTS OF HEXOSE-PHOSPHATES
Rodolfo Ferrari, Giuseppe Ghielmetti, and Aurelio Filippo Notarianni, Milan, Italy, assignors to SPA—Societa Prodotti Antibiotici S.p.A., Milan, Italy
No Drawing. Filed Dec. 29, 1967, Ser. No. 694,358
Claims priority, application Great Britain, Jan. 2, 1967, 113/67
Int. Cl. B07c 69/32
U.S. Cl. 260—234                                             8 Claims

ABSTRACT OF THE DISCLOSURE

There are described, as new compounds, salts of hexose-phosphates with amino acids and amino acid esters. These hexose-phosphate salts are useful as therapeutics in treating diseases of the liver, for example.

BACKGROUND OF THE INVENTION

The hexose-phosphates, especially glucose-1-phosphate, glucose-6-phosphate, fructose-1,6-diphosphate and 6-phosphogluconate, have been used for a long time in clinical therapy, usually in the form of the alkali metal or alkaline earth metal salts or of the salts with organic bases, such as mono-, di- and trialkylamines and mono-, di- and tri-hydroxyethylamines, or with simple nitrogen-containing organic compounds, such as morpholine, β-hydroxyethyl-piperazine and pyrrolidone.

As is known, the hexose-phosphates are used as intermediate metabolites in cardiology, hepatology and nephrology, as well as in the treatment of pathological conditions of the skin and as anti-glycodepletives, due to the high hexose and phosphorylative metabolism of tissues.

Amino acids are also used in large amounts in cases of increased need, pregnancy, growth and post-operative conditions following, for example, gastric resection. The most widely used amino acids are lysine, histidine, ornithine, citrulline, glycine, tryptophane, cysteine, arginine, glutamic acid and methionine.

Some amino acids have a specific application. Thus, lysine and tryptophane, for example, are important growth factors, histidine is useful for the treatment of degenerative conditions of the walls of the vascular system, whether due to senility or to toxic factors, citrulline and ornithine are used in toxic conditions due to liver impairment, since they participate in the ureogenesis cycle (Krebs-Henseleit cycle), methionine has been used for many years in the therapy of liver diseases, glycine is used in cases of degenerative myopathies and cysteine is known as an epithelium-repairing amino acid.

Furthermore, some synthetic amino acids are extremely important therapeutically, an example of such an amino acid being L - (—)-α-methyl-β-(3,4 - dihydroxyphenyl)-alanine (also known as α-methyl-DOPA).

In British patent specification No. 1,028,238, there is described arginine glucose-1-phosphate and pharmaceutical compositions containing it. This compound is not intended to come within the scope of the present invention.

SUMMARY OF THE INVENTION

We have now found that when therapeutically useful amino acids, be they naturally occurring or synthetic, or their esters, are converted into their salts with hexose-phosphates, the therapeutic action of the amino acids is considerably enhanced.

Thus, according to the present invention, there are provided new salts of amino acids, and of their esters, with hexose-phosphates, as well as pharmaceutical compositions containing them.

DETAILED DESCRIPTION OF THE INVENTION

As examples of hexose-phosphates which can be used to prepare the new salts, there may be mentioned glucose-1-phosphate, glucose-6-phosphate, fructose-1,6-diphosphate and 6-phosphogluconate.

In order to prepare the new salts according to the present invention, it is preferable to start from an inorganic salt, such as the sodium salt, of the hexose-phosphate in question. The cation can be conveniently removed by treatment with a suitable ion exchange resin to give a solution of the corresponding free hexose-phosphate which is then reacted with an amino acid or an amino acid ester. The salts obtained may be neutral or acidic, depending upon the amount of amino acid or amino acid ester used for the salt formation.

In the case of amino acids which are not very basic, such as citrulline, glycine, tryptophane, cysteine and methionine, they are preferably used in the form of their esters, such as the methyl or ethyl esters, since the basic characteristic of the amino acid is thereby enhanced.

The aqueous solutions of the new salts thus obtained are then concentrated under a vacuum at a low temperature to a syrupy consistency and slowly added, with stirring, to 4–10 times the amount by volume of a water-miscible organic solvent in which the salts formed do not dissolve. Examples of such organic solvents include methanol and ethanol. Most of the new salts crystallize but sometimes it is necessary to add diethyl ether to complete the precipitation. The new salts are obtained in the form of microcystalline powders which are soluble in water but insoluble in conventional organic solvents.

The new salts according to the present invention are especially useful because of their anti-toxic action and also for the treatment of diseases and disfunctions of the liver.

The following examples are given for the purpose of illustrating the present invention:

EXAMPLE 1

40 g. fructose-1,6-diphosphate disodium salt are treated with 500 ml. of a cation exchanger resin. 75.7 g. arginine monohydrate (free base) (4 mols arginine monohydrate per mol fructose-1,6-diphosphate) are then added to the aqueous solution obtained. The aqueous solution is concentrated to 300 ml. and the concentrate then slowly added to 3000 ml. methanol. The tetra-arginine salt of fructose-1,6-diphosphate crystallizes out. The crystals are filtered off, washed with methanol and dried in a vacuum at room temperature. The salt is obtained in the form of a white, microcrystalline powder which is very soluble in water but insoluble in alcohol and ether.

EXAMPLE 2

40 g. fructose-1,6-diphosphate disodium salt are treated, in aqueous solution, with 500 ml. of a cation exchanger resin. 56.8 g. arginine monohydrate (free base) (3 mols arginine monohydrate per mol fructose-1,6-diphosphate) are then added to the aqueous solution. The aqueous solution is concentrated to 280 ml. and slowly added to 2800 ml. methanol. The tris-arginine salt of fructose-1,6-diphosphate crystallizes out. The crystals are filtered off, washed with methanol and dried in a vacuum at room temperature. The salt is obtained in the form of a white, microcrystalline powder which is very soluble in water but insoluble in alcohol and ether.

EXAMPLE 3

48 g. diethyl glutamate hydrochloride (M.P. 112–114° C.); $[\alpha]_D^{21} = -22°$ (c.=2% in water) are dissolved in 200 ml. cold water and the solution allowed to percolate through an anion exchanger resin. The alkaline, aqueous solution of diethyl glutamate obtained is reacted with a 20% aqueous solution of 0.10 molar fructose-1,6-diphosphate. The aqueous solution is concentrated at room temperature to a syrupy consistency. It is then diluted with 300–400 ml. methanol and an equal volume of diethyl ether is added thereto. Bis-(diethyl glutamate)-fructose-1,6-diphosphate separates. It is very soluble in water but insoluble in ether.

EXAMPLE 4

72 g. diethyl glutamate hydrochloride are dissolved in 200 ml. cold water and the solution allowed to percolate through an anion exchanger resin. The alkaline, aqueous solution of diethyl glutamate obtained is reacted with a 20% aqueous solution of 0.10 molar fructose-1,6-diphosphate. The aqueous solution is concentrated at room temperature to a syrupy consistency. It is then diluted with 300–400 ml. methanol and an equal volume of diethyl ether is added thereto. Tris-(diethyl glutamate)-fructose-1,6-diphosphate separates. It is very soluble in water but insoluble in ether.

EXAMPLE 5

96 g. diethyl glutamate hydrochlorine are dissolved in 200 ml. cold water and the solution allowed to percolate through an anion exchanger resin. The alkaline, aqueous solution obtained is reacted with a 20% aqueous solution of 0.10 molar fructose-1,6-diphosphate. The aqueous solution is concentrated at room temperature to a syrupy consistency. It is then diluted with 300–400 ml. methanol and an equal volume of diethyl ether is added thereto. Tetra-(diethyl glutamate)-fructose-1,6-diphosphate separates. It is very soluble in water but insoluble in ether.

EXAMPLE 6

In the manner described in Example 3, an alkaline, aqueous solution of diethyl glutamate is reacted with glucose-1-phosphate, in the ratio of 2 mols diethyl glutamate per mol glucose-1-phosphate. Di-(diethyl glutamate)-glucose-1-phosphate is obtained in the form of a microcrystalline salt which is soluble in water but insoluble in ether.

EXAMPLE 7

In the manner described in Example 3, an alkaline, aqueous solution of diethyl glutamate is reacted with glucose-6-phosphate, in the ratio 2 mols diethyl glutamate per mol glucose-6-phosphate. Di-(diethyl glutamate)-glucose-6-phosphate is obtained in the form of a microcrystalline salt which is soluble in water but insoluble in ether.

The present invention also includes within its scope pharmaceutical compositions containing one or more of the new salts. These pharmaceutical compositions can be administered orally or parenterally in admixture with a solid or liquid pharmaceutical carrier.

Solid compositions for oral administration include compressed tablets, pills, dispersible powders, dragees and granules. In such solid compositions, at least one salt according to the present invention is admixed with at least one inert diluent, such as calcium carbonate, starch, alginic acid or lactose. The compositions may also comprise, as is common practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents and sweetening and flavoring agents.

The compositions according to the present invention for oral administration include capsules of absorbable material, such as gelatine, containing at least one of the salts according to the present invention, with or without the addition of diluents or excipients.

Preparations according to the present invention for parenteral administration include sterile aqueous or non-aqueous solutions, suspensions or emulsions. Examples of non-aqueous solvents or suspensing media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilized, for example, by filtration through bacteria-retaining filters, by incorporating into the compositions of sterilizing agents, by irradiation or by heating. They may also be produced in the form of sterile solid compositions which can be dissolved in sterile water or some other sterile injectable medium immediately before use.

The percentage of the new salts in the compositions of the present invention may be varied, it being necessary that it should constitute a proportion such that a suitable dosage for the desired therapeutic effect shall be obtained. In general, the preparations of the present invention should be administered, in the case of oral administration, to give 25–750 mg. of active substance per day and, in the case of parenteral administration, 25–500 mg. of active substances per day.

The following examples illustrate pharmaceutical compositions according to the present invention:

EXAMPLE 8

250 mg. tablets are prepared containing:

| | Mg. |
|---|---|
| Tetra-arginine salt of fructose-1,6-diphosphate | 100 |
| Starch | 145 |
| Magnesium stearate | 5 |

EXAMPLE 9

250 mg. tablets are prepared containing:

| | Mg. |
|---|---|
| Di-(diethyl glutamate) glucose-6-phosphate | 100 |
| Starch | 100 |
| Lactose | 45 |
| Magnesium stearate | 5 |

We claim:
1. A salt selected from the group consisting of the tetraarginine salt of fructose-1,6-diphosphate, the tris-arginine salt of fructose-1,6-diphosphate, bis-(diethyl glutamate)-fructose-1,6-diphosphate, tris-(diethyl glutamate)-fructose-1,6-disphosphate, tetra-(diethyl glutamate)-fructose-1,6-diphosphate, di - (diethyl glutamate)-glucose-1-phosphate, and di-(diethyl glutamate)-glucose-6-phosphate.

2. A salt according to claim 1 which is the tetraarginine salt of fructose-1,6-diphosphate.

3. A salt according to claim 1 which is the tris-arginine salt of fructose-1,6-diphosphate.

4. A salt according to claim 1 which is bis-(diethyl glutamate)-fructose-1,6-diphosphate.

5. A salt according to claim 1 which is tris-(diethyl glutamate)-fructose-1,6-diphosphate.

6. A salt according to claim 1 which is tetra-(diethyl lutamate)-fructose-1,6-diphosphate.

7. A salt according to claim 1 which is di-(diethyl glutamate)-fructose-1,6-diphosphate.

8. The salt according to claim 1 which is di-(diethyl glutamate)-glucose-1-phosphate.

References Cited

UNITED STATES PATENTS

| | | | |
|---|---|---|---|
| 3,002,966 | 10/1961 | Slodki | 260—234 |
| 3,066,135 | 11/1962 | Baruchello | 260—234 |
| 3,089,869 | 5/1963 | Mauvernay | 260—211.5 |
| 3,359,162 | 12/1967 | Ghielmetti | 260—234 |

OTHER REFERENCES

"Sugar Phosphates," The British Drug House Ltd. B.D.H. Laboratory Chemical Div., England, 1958, pp. 3–10, 260/234.

ELBERT L. ROBERTS, Primary Examiner

J. R. BROWN, Assistant Examiner

U.S. Cl. X.R.

424—180, 199